United States Patent Office 3,379,790
Patented Apr. 23, 1968

3,379,790
POLYCARBONATE-POLYSILOXANE COPOLYMERS
Walter Krauss, Cologne-Stammheim, and Reinhard Hebermehl, Leverkusen, Germany, assignors to Farbenfabriken Bayer Aktiengesellschaft, Leverkusen, Germany, a corporation of Germany
No Drawing. Continuation of application Ser. No. 115,086, June 6, 1961. This application Aug. 19, 1966, Ser. No. 573,721
Claims priority, application Germany, June 10, 1960, F 31,409
12 Claims. (Cl. 260—824)

ABSTRACT OF THE DISCLOSURE

A transparent copolymer of a high polymeric polycarbonate and a hydrocarbon substituted polysiloxane having about 2–4% by weight silicon bonded OH groups. The copolymers are useful for production of pressed masses and in lacquers, and have good heat resistance. They are produced by condensation by heating for in excess of 1 hour; the proportion of polysiloxane by weight is at least 50% of the polysiloxane plus polycarbonate.

This application is a continuation of Ser. No. 115,086, filed June 6, 1961, now abandoned.

The invention relates to the production of polysiloxane-containing mixed resins of improved stability.

Organo-polysiloxanes essentially consisting of units of the general formula

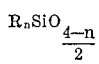

wherein each R denotes alkyl or aryl and $n$ means a number between 1 and 2, and which from their hydrolytic production still contain a portion of silicon-bonded OH groups normally amounting to 1 to 5 percent by weight, are known to be used for pressed masses, coating and impregnating lacquers which are hardened after application by heating. Films of such siloxane resins are unsatisfactory with regard to some of their properties; their surface hardness is insufficient, as is also their chemical stability, especially to hot water; and above all the cost of their production prevents such pure siloxane resins from being used extensively. Therefore, they have already been combined with silicon-free resins such as polyesters, phenol resins, epoxide resins, alkyd resins, by co-condensation, but hitherto this has led to a reduction of their good heat resistance or to an increased sensitivity to hydrolysis.

According to the invention mixed resins without the above mentioned disadvantages are obtained by inter-condensing low-polymeric hydrolysis products of hydrolyzable hydrocarbon-substituted silane derivatives with polycarbonates by heating, preferably at temperatures between 150 and 220° C. The proportion of the two resin components can be chosen arbitrarily; a proportion between 3:1 and 1:3 is preferred. The reaction is substantially accelerated by the use of an inert solvent; very suitable for this purpose are tetra- and deca-hydronaphthalene; high-boiling esters such as methylglycol acetate and ethylglycol acetate are also useful.

The process is carried out by mixing the siloxane with the polycarbonate and the solvent and slowly heating the mixture in the reaction vessel to the indicated temperature while cooling under reflux. The initially cloudy solution becomes clear within 1 to 3 hours; a sample, placed on glass plates, yields completely clear transparent layers. The solvent can then be distilled off and the residual yellowish to pale brown product taken up with toluene.

The low-polymeric organo-siloxanes to be used in this process and the production thereof are known; they can be obtained for example according to the process described in the United States Patent 2,687,399. They should only be condensed to such an extent that they still contain about 2–4 percent by weight of hydroxyl groups bonded with silicon; however, useful products are also obtained with a higher or lower content of OH groups.

The high-polymeric polycarbonates to be used according to the invention are likewise known. Polyesters of carbonic acid of this type are produced for example by reacting aromatic dihydroxy compounds such as hydroquinone or resorcinol, and especially di-(hydroxyaryl)-alkanes, if desired in admixture with aliphatic or cycloaliphatic dihydroxy compounds, with dialkyl or diaryl esters of carbonic acid or with phosgene, or by reacting bis-(chlorocarbonic acid) esters of aromatic dihydroxy compounds with free aromatic or aliphatic or also cycloaliphatic dihydroxy compounds, for example according to German patent specifications Nos. 959,497; 971,777; 971,-790; 1,011,148.

According to a further improvement of the process of the present invention, an accelerated reaction is achieved by adding, as a further reaction component, well-known polyesters containing unesterified hydroxyl groups such as are obtainable from aromatic or aliphatic dicarboxylic acids, for example a phenylene-dicarboxylic acid, succinic acid, adipic acid, and an excess of di- or polyhydric alcohols such as ethylene glycol, butylene glycol, trimethylol propane, or hexane-triol. This polyester is to be added in a quantity so that the proportion by weight of polycarbonate to polyester amounts to between 9:1 and 1:3.

The co-condensation products produced according to the invention essentially exhibit the same heat resistance as the pure organo-polysiloxane resins, but are superior with regard to their surface hardness and, in particular, to their stability to hot water; their thermoplasticity is substantially lower than that of pure organo-polysiloxane resins. They can be mixed in a manner known as such with solvents, fillers, pigments, hardening catalysts, and used as coating and impregnation lacquers and for the production of pressed masses of, for example, glass fabric. They are hardened by heating to elevated temperatures, particularly to temperatures above 200° C. Moreover, the co-condensation products according to the invention, especially those produced with the addition of hydroxyl group-containing polyesters, are compatible with isocyanates and masked isocyanates and can therefore be hardened with the latter in a manner known as such to give insoluble products.

The following examples are given for the purpose of illustrating the invention.

Example 1

A mixture of 1 mol of dimethyl-dichlorosilane, 1 mol of diphenyl-dichlorosilane, 1.4 mols of methyl-trichlorosilane and 0.54 mol of phenyl-trichlorosilane is hydrolyzed according to the process described in detail in the United States Patent 2,687,399 in the presence of a mixture of butyl acetate and butanol with water. After completion of the hydrolysis, the mixture is allowed to stand, until the emulsion has settled in two layers, the aqueous hydrochloric layer is separated off and the solution consisting of butyl acetate, butanol and partially condensed silanols is washed until acid-free. This solution is enriched to a siloxane content of about 50 percent by weight by heating under vacuum. The siloxane itself contains approximately 4 percent by weight of hydroxyl groups bonded with silicon.

2 parts by weight of this solution are mixed with 1 part by weight of a high-polymeric polycarbonate prepared according to the process described in detail in German patent specification No. 971,790 by reacting 2,2-di-(4-hydroxyphenol)butane with phosgene, and having an approximate K value of 50, and 3 parts by weight of tetra-hydro-naphthalene are added to this mixture. The mixture is slowly heated to the boiling temperature of tetra-hydro-naphthalene while simultaneously driving off the more volatile solvent portions, and the reaction mixture is kept at this temperature, until it has become clear, i.e. normally for about 2 hours, and until a sample thereof, placed on glass plates, leaves behind clear transparent films after evaporation of the tetrahydronaphthalene. From the solution, tetrahydro-naphthalene is distilled off under vacuum and the residual yellowish product is taken up with toluene. With the solution thus obtained clear pigmented lacquers are produced in conventional manner.

Example 2

4 parts by weight of the same siloxane solution and 1 part by weight of the same polycarbonate as in Example 1 are mixed with 1 part by weight of a condensation product from trimethylol propane (1 mol), ethylene-glycol (0.75 mol) and terephthalic acid dimethyl ester (1 mol), the mixture is taken up with tetrahydro-naphthalene and slowly heated to the boiling temperature of the latter. After distilling off the more volatile solvent portions, the mixture is heated under reflux, normally for 1 to 2 hours, until the solution becomes clear and yields coatings on glass plates which remain clear after cooling. After evaporation of the tetrahydro-naphthalene under vacuum, the yellowish to pale brown residue is taken up with toluene and lacquers are produced therefrom in conventional manner.

Example 3

The process is initially carried out exactly as described in Example 2, the toluene solution being finally adjusted to 50 percent by weight of the reaction product. 100 parts by weight of this solution are then mixed with 19 parts by weight of a diisocyanate solution containing 13 percent by weight of NCO and composed of 25 percent by weight of ethyl acetate and 75 percent by weight of the reaction product from 3 mols of toluylene-diisocyanate and 1 mol of a mixture of polyhydric alcohols essentially consisting of trimethylol-propane. The mixture is diluted to a solids content of 30 percent by weight with a solvent mixture of equal parts of methyl-glycol acetate, butyl acetate, ethyl acetate and toluene. When the solution thus obtained is coated onto glass plates and metal sheets, hard heat-resistant film coatings of only slight thermoplasticity are obtained after drying at room temperature overnight.

What is claimed is:
1. Process for the production of resinous transparent co-condensates, which comprises condensing together by heating for a time in excess of 1 hour to a temperature between 150 and 220° C. a high polymeric polycarbonate with a hydrocarbon substituted polysiloxane having per silicon atom about 1.5 hydrocarbon substituents selected from the group consisting of alkyl and aryl and having about 2–4 percent by weight of silicon bonded OH groups, the proportion of polysiloxane by weight being at least 50% of the polysiloxane plus polycarbonate, wherein said polycarbonate is produced by reacting:
   (a) aromatic dihydroxy compound with dialkyl or diaryl esters of carbonic acid, or phosgene, or
   (b) bis-(chlorocarbonic acid) esters of aromatic dihydroxy compounds with aromatic, aliphatic or cycloaliphatic dihydroxy compounds.

2. Process according to claim 1, wherein said polysiloxane is fully substituted by hydroxy and hydrocarbon substituents.

3. Process according to claim 1, said polycarbonate being derived from dihydroxy benzene or dihydroxy aryl alkane.

4. Process according to claim 3, wherein condensation is carried out in the presence of a solvent.

5. Process according to claim 4, wherein the solvent is selected from the group consisting of tetrahydronaphthalene, decahydronaphthalene, methylglycol acetate and ethylglycol acetate.

6. Process according to claim 5, the polysiloxane being phenylmethyl polysiloxane.

7. Process according to claim 3, wherein the said organopolysiloxane is phenylmethyl polysiloxanes.

8. A copolymer produced by the method of claim 1.

9. A copolymer according to claim 8, wherein the siloxane comprises phenylmethyl polysiloxanes.

10. A coating composition comprising a copolymer according to claim 8 as a film-forming agent dissolved in a solvent.

11. A coating composition according to claim 10, the solvent being present in a major proportion.

12. A copolymer according to claim 8, the said polysiloxane being phenylmethyl polysiloxane.

References Cited

UNITED STATES PATENTS

| | | | |
|---|---|---|---|
| 2,999,835 | 9/1961 | Goldberg | 260—47 |
| 2,999,845 | 9/1961 | Goldberg | 260—47 |
| 3,189,662 | 6/1965 | Vaughn | 260—824 |

SAMUEL H. BLECH, *Primary Examiner.*